June 10, 1952 S. M. RANSOME 2,600,323
AUTOMATIC CUTTER SHARPENING MACHINE
Filed Aug. 12, 1948 5 Sheets-Sheet 1
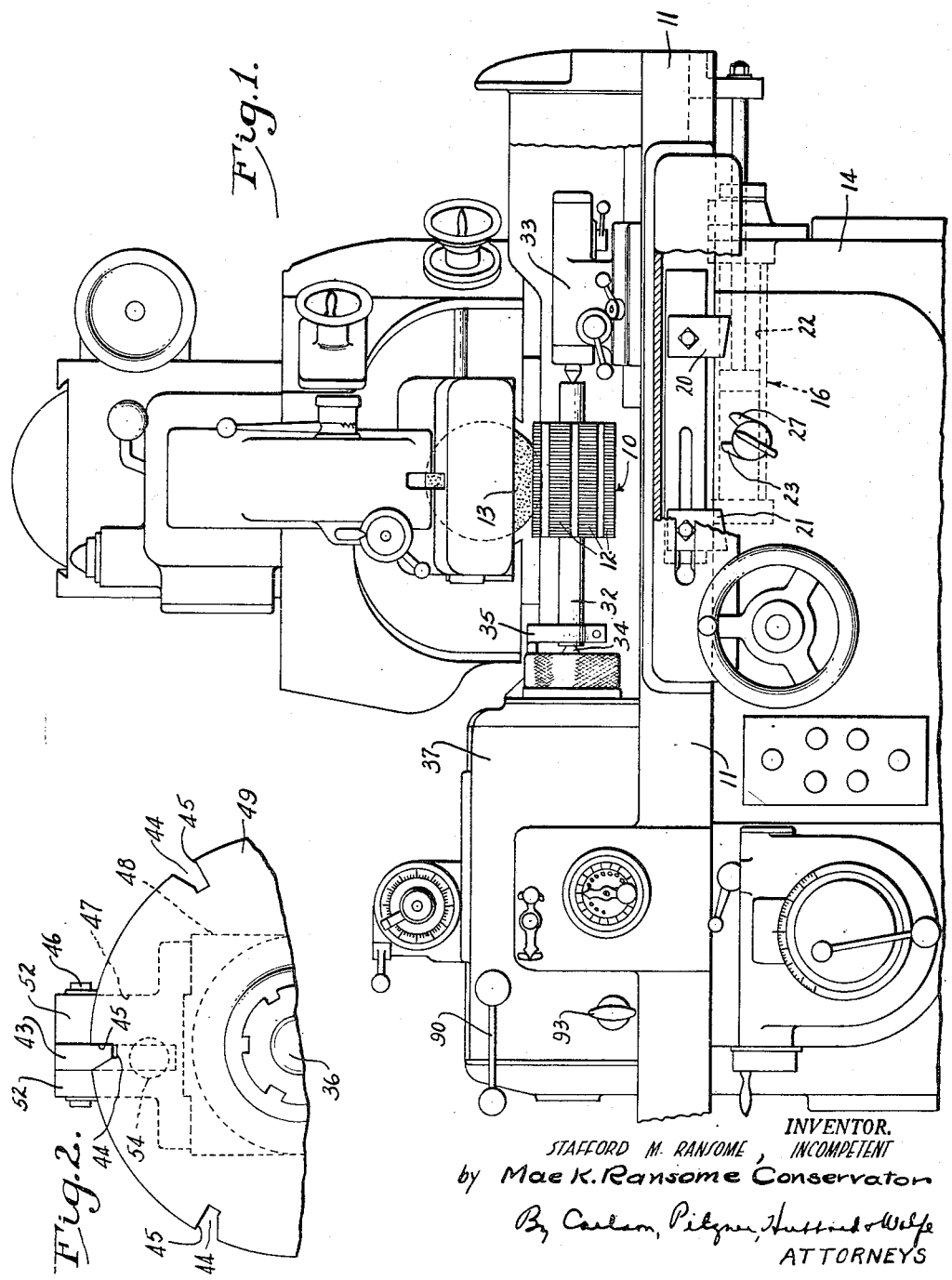
INVENTOR.
STAFFORD M. RANSOME, INCOMPETENT
by Mae K. Ransome Conservator
By Carlson, Pitzner, Hubbard & Wolfe
ATTORNEYS

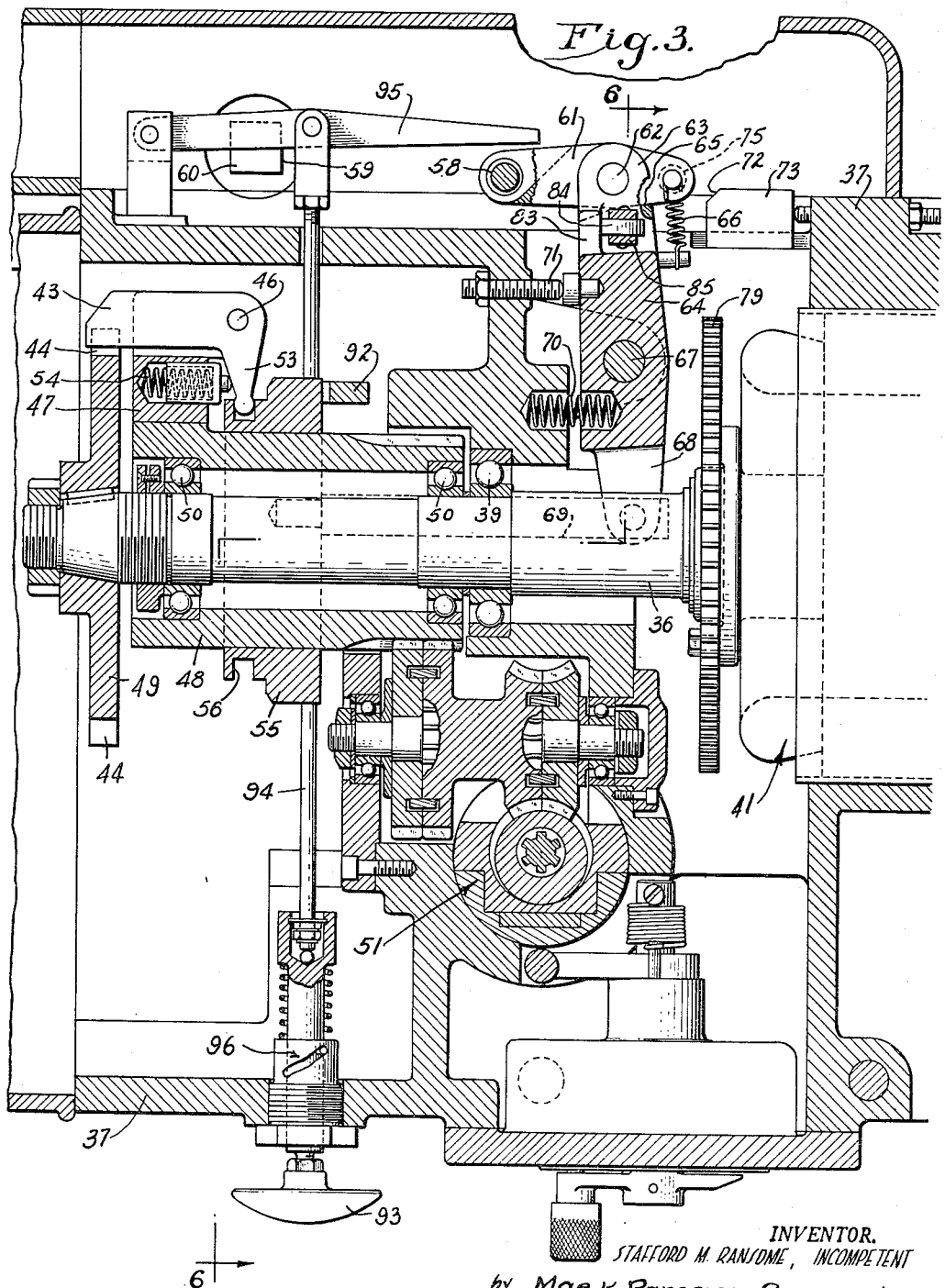

June 10, 1952  S. M. RANSOME  2,600,323
AUTOMATIC CUTTER SHARPENING MACHINE
Filed Aug. 12, 1948  5 Sheets-Sheet 3

INVENTOR.
STAFFORD M. RANSOME, INCOMPETENT
by Mae K. Ransome Conservator
By Carlson, Pitzner, Hubbard & Wolf
ATTORNEYS June 10, 1952  S. M. RANSOME  2,600,323
AUTOMATIC CUTTER SHARPENING MACHINE
Filed Aug. 12, 1948  5 Sheets-Sheet 5

INVENTOR.
STAFFORD M. RANSOME, INCOMPETENT
by Mae K. Ransome Conservator
By Carlson, Pitzner, ———— Wolfe
ATTORNEYS Patented June 10, 1952

2,600,323

UNITED STATES PATENT OFFICE 2,600,323

AUTOMATIC CUTTER SHARPENING MACHINE

Stafford M. Ransome, incompetent, Rockford, Ill., by Mae K. Ransome, conservator, Rockford, Ill., assignor to Barber-Colman Company, Rockford, Ill., a corporation of Illinois Application August 12, 1948, Serial No. 43,882

14 Claims. (Cl. 51—216)

1

This invention relates to machines for sharpening the angularly spaced teeth of rotary cutters in successive reciprocations of the cutter back and forth across the face of a grinding wheel. After each reciprocation and while the cutter is out of engagement with the wheel, it is indexed to bring the next tooth into grinding position.

The primary object is to provide a novel and simplified mechanism for indexing the cutter in proper synchronism with respect to the reciprocations of the cutter support whereby to insure proper indexing under all conditions as well as to obtain precision in the positioning of the cutter teeth.

Another object is to provide a separate power actuator for indexing of the cutter and to control the operation thereof in a novel manner in response to the motion of the cutter support.

A further object is to provide novel mechanism for releasing the latch dog of the cutter support preparatory to indexing and then reconditioning the dog for reengagement to terminate the indexing motion and lock the cutter.

Still another object is to provide a novel mechanism for controlling the operator for reciprocating the cutter support so as to correlate the strokes of the latter with the release and reengagement of the latch dog of the cutter indexing mechanism.

The invention also resides in the novel and simple construction of the parts by which the foregoing objects are attained.

Other objects and advantages of the invention will become apparent from the following detailed description taken in connection with the accompanying drawings, in which Figure 1 is a front elevational view of a cutter sharpening machine embodying the novel features of the present invention.

Fig. 2 is a fragmentary end view of part of the indexing mechanism.

Fig. 3 is a fragmentary sectional view taken substantially along the line 3—3 of Fig. 6.

Figure 4:
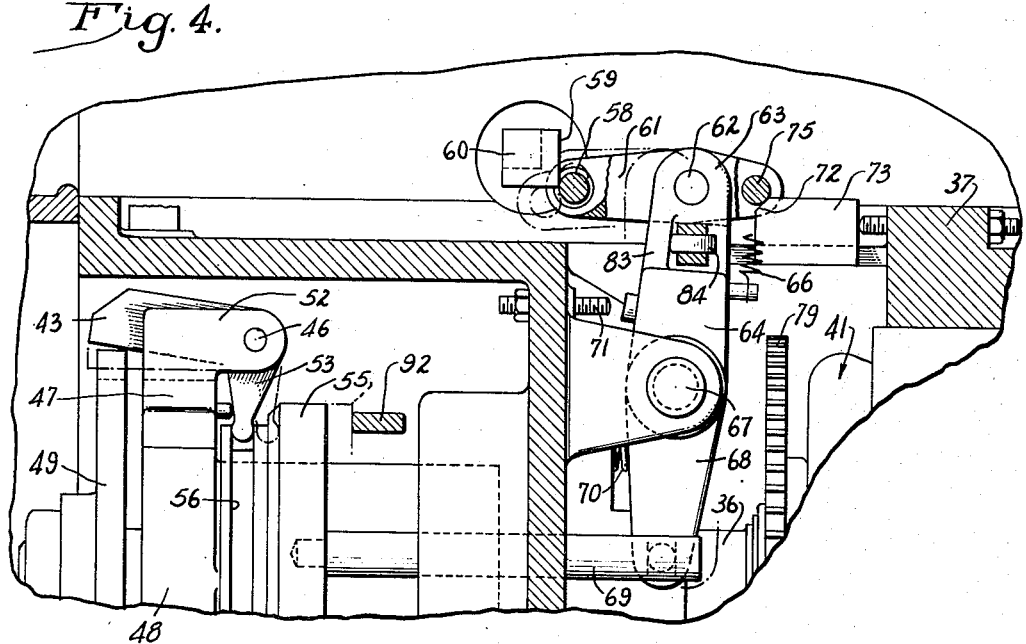
Fig. 4 is a similar fragmentary view showing a different position of the parts.
Figure 5:
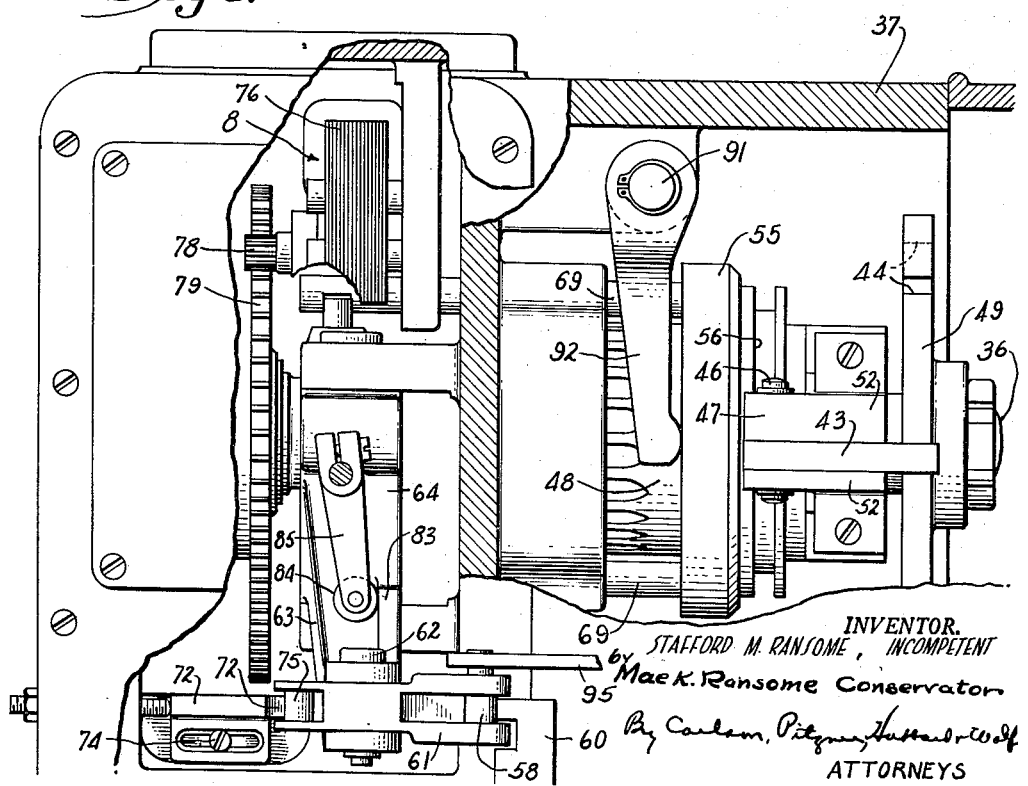
Fig. 5 is a fragmentary rear view of the spindle indexing mechanism with the housing thereof broken away and shown in section.

In the machine shown in the drawings for purposes of illustration, sharpening of the cutter such as a gear hob 10 is effected during a series of reciprocations of a table 11 between each of which the cutter is indexed to bring a succeeding row of teeth 12 into operative association with the conical face of a grinding wheel 13 which is positioned to engage the tooth faces along the desired plane.

The grinding wheel is mounted adjustably above the table which is supported on the machine bed 14 and slides back and forth on ways 15 thereon. Herein, such reciprocation is effected by a fluid motor 16 (Fig. 8) the energization of which from a source 17 of pressure fluid is controlled in the usual way by a relay valve 18 which in turn is actuated by fluid pressure controlled by a reversing valve 19 adapted to be shifted between opposite limit positions by dogs 20 and 21, one of which is adjustable along the table. The fluid pressure source 17 may be a pump driven by an electric motor 17$^a$ which is energized through the switches of a relay 17$^b$ initially energized by a switch 17$^c$ and held energized through a switch 17$^d$.

With the parts positioned as shown, high pressure fluid is being admitted to the right-hand end of the cylinder 22 to advance the table to the left. As the table approaches the end of its left stroke, the dog 20 engages a lug 23 to shift the slide 24 of the reversing valve to the right and reverse the connections between the cylinder and the high and low pressure lines 25 and 26. The table then moves to the right until the dog 21 encounters the lug 27 and shifts the valve slide 24 back to the position shown in Fig. 8 thereby again reversing the connections to initiate movement of the table to the left.

Figure 8:
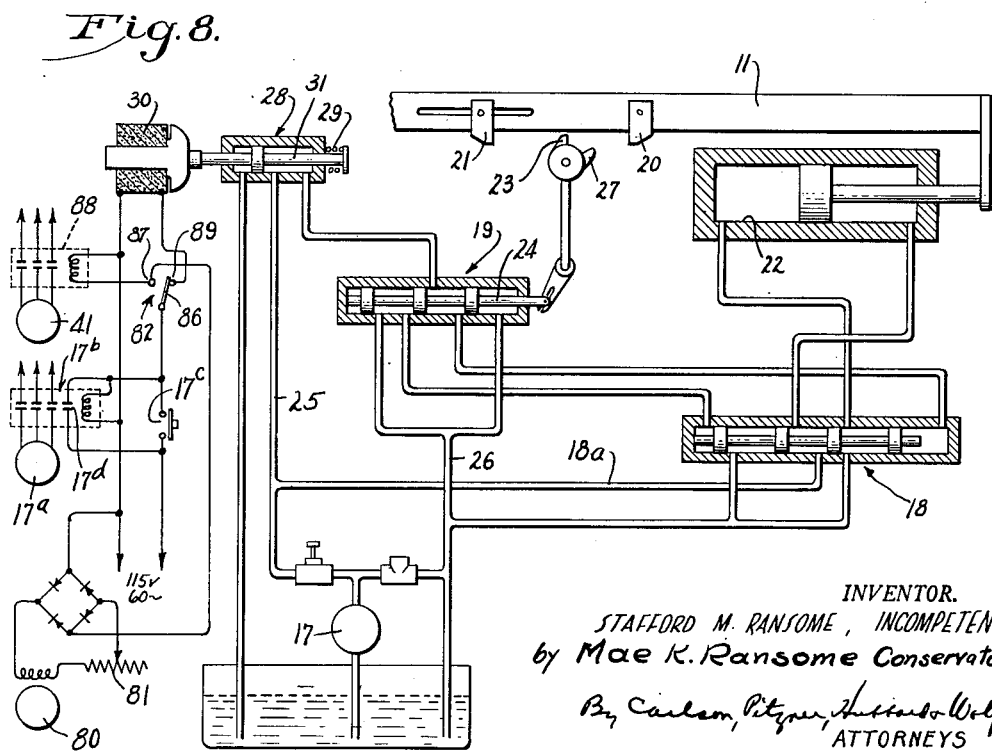
Fig. 8 is a schematic view and hydraulic and electric circuit diagram.

To disable the table actuator under certain conditions to be described later, the flow of pressure fluid to the reversing valve is controlled by a valve 28 whose member is urged by a spring 29 in a direction to interrupt the fluid flow through the supply line 25. When a solenoid 30 is energized, the valve member 31 is drawn to the left as shown in Fig. 8 thereby opening the supply line 25.

Figure 7:
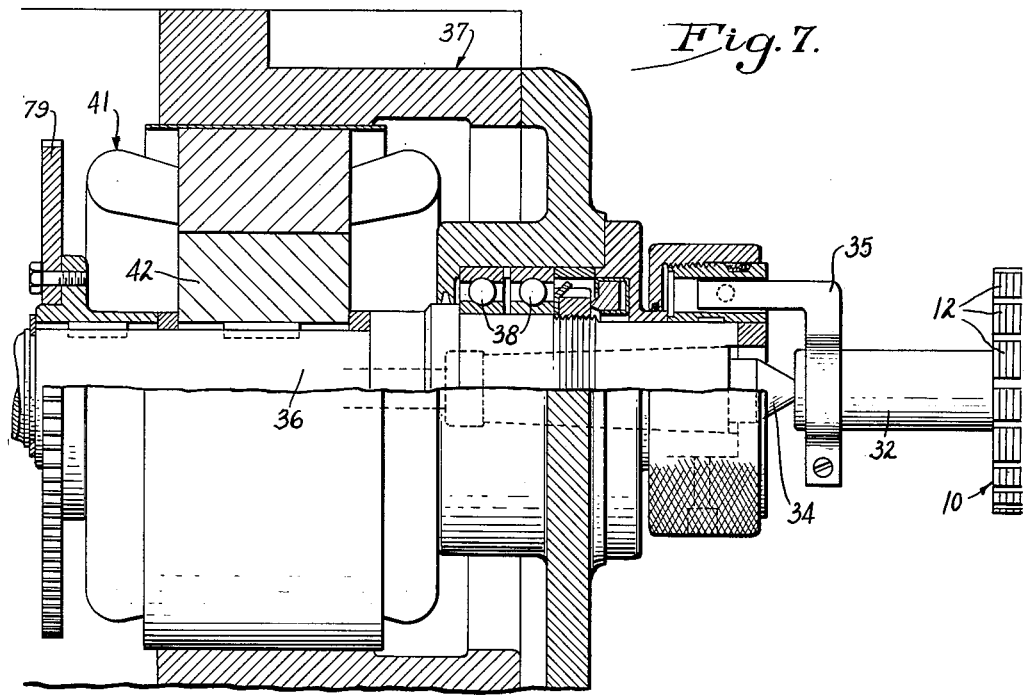
Fig. 7 is a fragmentary vertical sectional view.

The cutter to be sharpened is keyed to a horizontal arbor 32 disposed parallel to the table motion and supported at one end on a tailstock 33 on the right-hand end of the table 11. The other end of the arbor is supported by the center 34 (Fig. 7) and coupled by a drive dog 35 to a spindle 36 which projects through a headstock frame 37 and is journaled in bearings 38 and 39 (Figs. 3 and 7), the headstock being secured to the left-hand end portion of the table 11.

In the present instance, power for turning of the spindle 36 to advance the cutter step-by-step and present the successive rows of the teeth 12 to the grinding wheel 13 is derived from an independent source such as an electric torque motor 41 (Figs. 3 and 7) whose rotor 42 is keyed to the spindle and whose stator is secured in a cylindrical inner end portion of the headstock housing. The extent of the indexing movement is determined by entry of a latch dog 43 (Figs. 2, 3, 4, and 5) into the outwardly opening peripheral notches 44 around the periphery of a plate or disk 49 keyed to the outer end of the spindle 36. The trailing walls 45 of the notches are spaced accurately to correspond to the angular spacing of the teeth 12 on the cutter to be sharpened and the dog 43 is adapted to seat closely in the roots of the notches so that the cutter is positioned precisely when the dog is seated in a notch.

The dog is pivoted on a crosspin 46 (Figs. 2, 3, 4, and 5) mounted on the outer end of an arm 47 on a sleeve 48 rotatably supported through bearings 50 on the spindle 36. Through a mechanism indicated generally at 51 (Fig. 3) and forming the subject matter of an application by John P. Scone, Serial No. 47,435, filed September 2, 1948, and which issued as Patent No. 2,547,981, on April 10, 1951 the sleeve 48 and the latch 43 thereon are adapted to be turned either manually or automatically to vary the angular position of the cutter for feeding the teeth thereof toward the wheel or for imparting the desired lead to the cutting faces of the teeth. For the purpose of this application, the sleeve may be considered as stationary so as to hold the latch dog 43 in a fixed angular position.

The latch dog 43 is disposed between and laterally supported by lugs 52 and an inwardly projecting arm 53 thereon is urged by a spring 54 in a direction to swing the dog inwardly and thus cause it to enter the next notch 44 presented thereto in the turning of the index plate 49 following withdrawal of the dog to initiate an indexing movement. Such withdrawal is effected by outward axial shifting of a ring 55 (Figs. 3 and 4) loose on the sleeve 48 and having a groove 56 in which the inner rounded end of the latch arm 53 rides.

Figure 6:
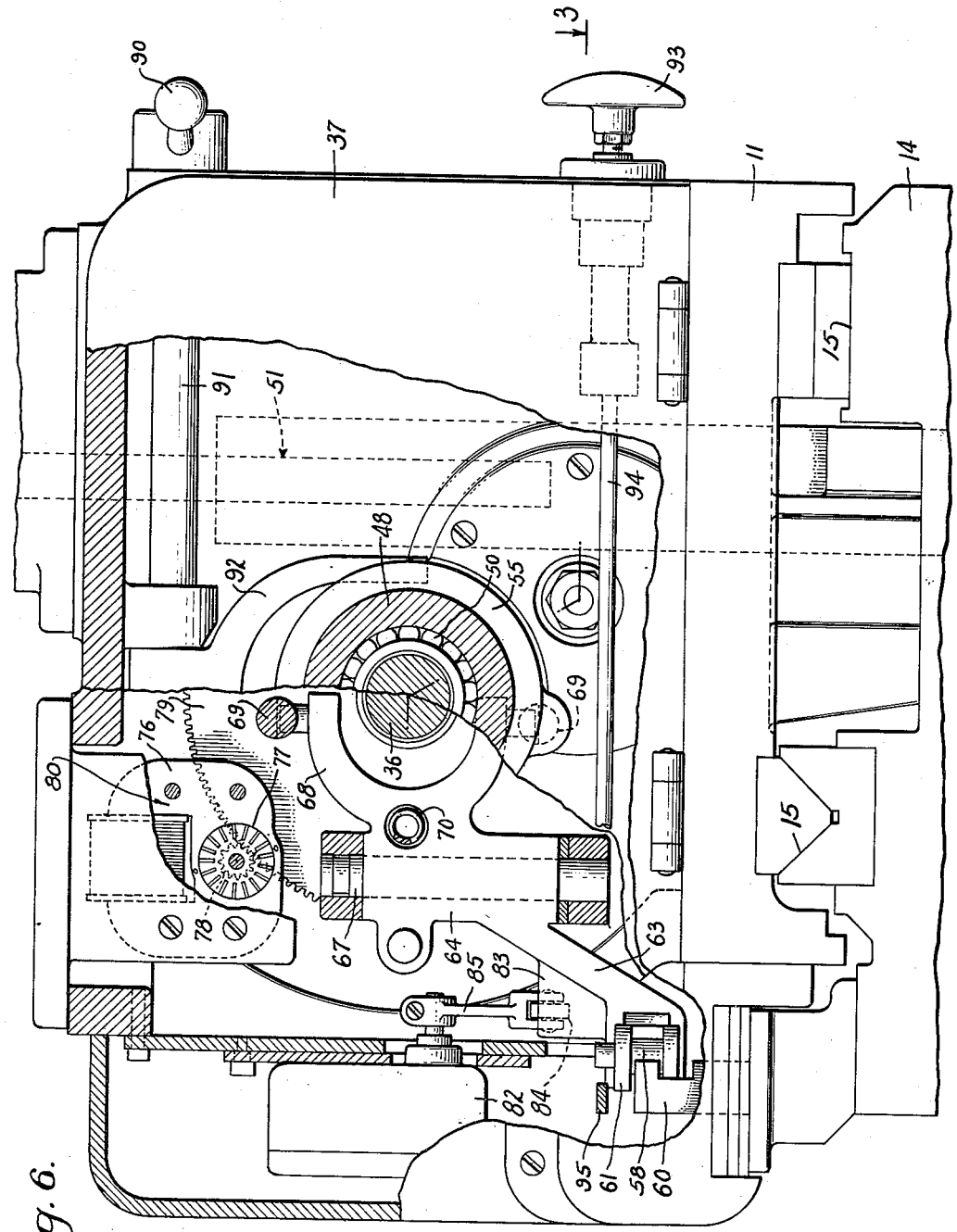
Fig. 6 is a section taken along the line 6—6 of Fig. 3.

Shifting of the ring 55 to withdraw the latch dog and permit indexing of the cutter is effected when the table approaches the limit of its return or left-hand stroke. To this end, a trip roller 58 (Figs. 3 to 6) is mounted on the headstock to move with the table and is normally disposed as shown in Fig. 3 in a position to encounter the inner face 59 of a post 60 rigid with an upstanding from the machine bed in the path of the roller. To support the roller for movement transversely of the table motion so it may be released after being blocked by the stop, it is carried on the bifurcated end of a lever 61 pivoted at 62 intermediate its ends on the outer bifurcated end of the downwardly projecting arm 63 of a lever 64 which extends transversely of the table and carries a stop 65 against which the lever 61 is normally held by a spring 66 to locate the roller in a position to engage the post 60. Intermediate its ends, the lever 64 is fulcrumed on a vertical pin 67 on the headstock, and the other end of the lever is forked as indicated at 68 (Fig. 6) to straddle the spindle 36 and is connected rigidly by two rods 69 to opposite sides of the latch dog release ring 55. A compression spring 70 (Figs. 3 and 6) acting on the lever 64 urges the latter in the direction of retraction of the table and against a stop 71 (Fig. 3) which is adjustable to vary the position in the table stroke at which the trip roller 58 encounters the post 60.

After the trip roller 58 has engaged the stop surface 59 and caused the lever 64 to be swung far enough to withdraw the latch dog 43, the roller is shifted laterally of the table motion and allowed to pass the stop as shown in phantom in Fig. 4. This is accomplished by an incline 72 on a cam 73 (Figs. 3, 4, and 5) positioned to engage a crosspin 75 on the lever 61 in the final retracting movement of the table and move the roller 58 inwardly as shown in Fig. 4. The cam is clamped against a part on the table and slotted to permit adjustment of the cam by a screw 74 (Fig. 5) to vary the point in the final table movement so that the cam becomes effective to release the blocked roller.

Means is provided for limiting the speed attained by the indexing motor 41 when it becomes energized so as to minimize the shock and impact incident to stopping the spindle and the parts thereon when the dog 43 drops into the next notch on the index plate. Preferably, this means acts to exert a magnetic drag on the motor and herein is an eddy current brake 80 comprising a stator 76 (Figs. 5 and 6) adapted to be energized by direct current and coacting with a suitable rotor 77 such as an iron cylinder with copper inductor bars. A pinion 78 on the rotor shaft meshes with a gear 79 on the spindle 36 to produce a substantial speed reduction (preferably 15 to 1) between the brake and motor shafts. The degree of energization of the brake coil and therefore the magnitude of the resulting magnetic drag may be adjusted through a suitable rheostat 81.

In order to facilitate withdrawal of the latch dog 43 in the manner described above and to minimize heating of the parts, it is preferred to maintain the motor 41 deenergized except when the indexing of the spindle is being effected. To this end, energization of the motor and also of the eddy current brake 80 is controlled by a switch 82 (Figs. 6 and 8) which is mounted on the headstock housing 37 and is actuated in the initial movement of the lever 64 resulting from blocking of the roller 58 by the stop post 60. This is accomplished by a lug 83 on the lever positioned to engage a roller 84 on the arm 85 by which the switch is actuated as soon as the lever 64 starts to move.

The switch is of the double throw type having a contact 86 (Fig. 8) which is adapted, when its actuating arm 85 is freed by retraction of the lug 83, to disengage a contact 87 and open the circuit through a relay 88 by which the motor 41 is controlled, the eddy current brake 80 being deenergized by opening of the same switch. At this same time, contacts 86 and 89 are engaged to connect the solenoid 30 across the power line. When the switch arm is actuated by the lug 83 as the latch dog 43 is withdrawn from a notch on the index plate, the contacts 86, 87 disengage and contacts 86 and 89 engage thereby deenergizing the solenoid 30 and completing the circuit for energizing the motor 41 and the brake 80.

*Operation*

Let it be assumed that the parts are positioned as shown in Fig. 8 with the table 11 moving to the left. After the cutter has moved free of the grinding wheel and just before the table lug 20 shifts the valve 19 to reverse the table motion, the trip roller 58 will come into engagement with the stop surface 59. With the roller thus blocked, the continued movement of the table swings the lever 64 clockwise as viewed in Fig. 3, thereby shifting the ring 55 to lift the latch dog 43 out of the notch 44 in the index plate 49 as shown in Fig. 4. In this same movement of the lever 64 and substantially simultaneously with the release of the index plate by the dog, the switch 82 is actuated to energize the motor 41 and the eddy current brake through the circuit above described. The indexing motion of the spindle starts immediately but before the next notch 44 has been presented to the dog 43, the table will have moved far enough to bring the incline 72 of the cam 73 into engagement with the follower 75 of the blocked lever 61 and move the roller 58 laterally out of engagement with the stop surface 59. Then the roller is free to pass the stop so as to allow the lever 64 and the latch dog 43 to move under the action of the springs 54 and 70. The dog thus comes against the periphery of the index plate and drops into the next notch 44 as soon as the indexing motion of the spindle is completed. When this occurs, the parts will be positioned as shown in phantom in Fig. 4. The indexing motion of the spindle is thus arrested without severe shock due to the limitation on the speed of the motor imposed by the eddy current brake. The spindle becomes positioned accurately as the dogs 43 seat fully in the plate notch.

In this return motion of the parts to lock the spindle in its new position, the switch arm 85 is retracted by its spring so that the switch 86, 89 is opened to deenergize the motor 41 and the eddy current brake 80, and the switch 86, 89 is closed to reenergize the solenoid 30 and thus actuate the valve 28 to resume the supply of pressure fluid to the reversing valve 19. The latter, having been shifted to its right-hand position by the dog 20, will now admit pressure fluid to the relay valve 18 to shift the latter to the right and thereby admit pressure fluid from the line 18ᵃ to the head end of the cylinder 22. Movement of the table to the right is thus initiated.

It will be observed that while the latch dog 43 is retracted, the solenoid 30 is deenergized so that the valve member 31 is held in its right-hand position thereby interrupting the supply of pressure fluid to the reverse valve 19. However, pressure continues to flow from the supply line 18ᵃ through the relay valve and to the rod end of the cylinder 22 to complete the table retracting movement. Therefore, even though the member 24 of the latter valve is shifted to the right by the table dog 20 as the table reaches its final retracted position, the position of the relay valve 18 remains unchanged so long as the solenoid 30 is deenergized and the spindle released by the latch dog 43. As a result of this interlock between the indexing mechanism and the table actuator, the latter is held disabled and starting of the forward stroke of the table is prevented until the indexing of the spindle has been completed as evidenced by proper entry of the latch dog 43 into a notch of the index plate.

In setting up the machine prepartory to sharpening a cutter, it is sometimes desirable, for example, in changing the index plate 49, to index the cutter spindle by hand. This may be accomplished by turning a hand lever 90 (Fig. 1) on a rockshaft 91 (Fig. 5) having an arm 92 fixed thereon with its free end positioned for engagement with the ring 55 by which the latch dog 43 may be withdrawn.

It is also desirable under certain set-up conditions to reciprocate the table without indexing the cutter spindle 36. This may be accomplished by pulling outwardly on a knob 93 (Figs. 1 and 3) which through a rod 94 swings a pivoted arm 95 inwardly. The free end of the arm is engageable with the lever 61 and, when thus moved, holds the roller 58 in a position to pass the blocking stop 60. The position of the arm 95 may be retained by a bayonet lock 96.

With the machine constructed as described above, it will be apparent that the action of the indexing mechanism is correlated accurately with table motions thereby insuring operation of the parts in the proper sequence under all conditions. By employing a separate indexing actuator such as the motor 41, the indexing motion which is of substantial length may be effected during a relatively short movement of the table so that the overtravel of the latter which is required to allow for indexing of the cutter may be reduced to a minimum. At the same time, the speed of the indexing motion may be adjusted to suit varying conditions and adjusted so as to minimize the impact incident to stopping the spindle in each new position. The latch dog may thus be utilized to position the cutter with the desired high precision while at the same time minimizing the length of each cycle of table reciprocation and correspondingly increasing the over-all production capacity of the machine.

What is claimed is:

1. A cutter sharpener having, in combination, a horizontal table movable back and forth in automatically repeated forward and return strokes, means on said table supporting a cutter to be sharpened including a spindle rotatable about an axis paralleling the table motion, an index disk fast on said spindle and having peripheral notches, a latch dog mounted on said table for movement into and out of said notches and yieldably urged against the disk periphery, an electric motor adapted when energized to turn said index disk and said spindle, a lever mounted on said table and extending transversely of the table motion, a second lever pivoted on one end of said first lever and extending parallel to the table motion, a stationary stop positioned to block one end of said second lever in the final return motion of said table whereby to swing said first lever as the table continues, means actuated by such motion of said first lever to withdraw said latch dog and simultaneously energize said motor, and a cam engageable with said second lever and operable in the subsequent movement of said table to swing the lever out of blocking engagement with said stop and thereby release said latch dog for inward movement, said motor being deenergized in response to entry of said latch dog in the next notch on said disk.

2. A cutter sharpener having, in combination, a horizontal table reciprocable back and forth, means on said table supporting a cutter to be sharpened including a spindle rotatable about an axis paralleling the table motion, an index plate fast on said spindle and having angularly spaced notches, a latch dog mounted on said table for movement into and out of said notches and yieldably urged against the plate, a power actuator adapted when energized to turn said index plate and said spindle, a lever mounted on said table and extending transversely of the table motion, a second lever pivoted on one end of said first lever and extending parallel to the table motion, a stationary stop positioned to block one end of said second lever in the final return motion of said table whereby to swing said first lever as the table continues, means actuated by such motion of said first lever to withdraw said latch dog and simultaneously energize said actuator, and a cam engageable with said second lever and operable in the continued movement of said table to swing the lever out of blocking engagement with said stop and thereby release said latch dog for movement into the next one of said notches.

3. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for movement into and out of said notches and yieldably urged toward said member, a lever mounted on said table and extending transversely of the table motion, a second lever pivoted on one end of said first lever an extending parallel to the table motion, a stationary stop positioned to block one end of said second lever in the final return motion of said table whereby to swing said first lever as the table continues, means actuated by such motion of said first lever to withdraw said latch dog, means operable as an incident to withdrawal of said dog and release of said member to apply a torque to said spindle to turn the latter, and a cam engageable with said second lever and operable in the continued movement of said table to swing the lever out of blocking engagement with said stop and thereby release said latch dog for entry in the next notch presented thereto.

4. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for movement into and out of said notches and yieldably urged toward said member, a lever mounted on said table and extending transversely of the table motion, a second lever pivoted on one end of said first lever and extending parallel to the table motion, stop means positioned to block one end of said second lever in the final return motion of said table whereby to swing said first lever as the table continues, means actuated by such motion of said first lever to withdraw said latch dog and release said member for indexing movement, and means operable in the continued movement of said table to swing said second lever out of blocking engagement with said stop.

5. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for movement into and out of said notches and yieldably urged toward said member, a part mounted on said table for movement relative thereto longitudinally of the table motion, spring means urging said part in the direction of forward stroke of the table, a lever pivoted on said part and extending longitudinally of the table, a stationary stop positioned to block one end of said lever in the final return motion of said table whereby to move said part as the table continues, means actuated by such motion of said part to withdraw said dog and release said spindle for indexing movement, and means operable in the continued movement of said table to move said lever laterally of the table motion and out of blocking engagement with said stop and thereby release said part so as to permit entry of said latch dog in the next notch presented thereto.

6. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for movement into and out of said notches, a part mounted on said table for movement longitudinally thereto and yieldably urged in the direction of one stroke of the table, a lever pivoted on said part and extending longitudinally of the table motion, stop means positioned to block one end of said lever in the final portion of the other stroke of said table whereby to move said part as the table continues, means actuated by such motion of said part to withdraw said dog and release said index member, and a cam on said table engageable with said lever in the continued movement of said table and operable to swing the lever out of blocking engagement with said stop whereby to release said part and therefore the latch dog for entry of the latter in the next notch presented thereto.

7. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for movement into and out of said notches and yieldably urged toward said member, a lever, means on said table supporting said lever for movement transversely and also longitudinally of the table motion, stop means positioned to engage said lever in the final return motion of said table and cause relative longitudinal movement between the lever and table as the table continues, means actuated by such longitudinal motion to withdraw said latch dog and release said index member, and a cam on said table operable in the continued movement of the table to move said lever out of engagement with said stop means whereby to release said latch dog for entry in the next notch presented thereto.

8. A cutter sharpener having, in combination, a horizontal table reciprocable back and forth, means on said table supporting a cutter to be sharpened including a spindle rotatable about an axis paralleling the table motion, an index plate fast on said spindle and having therein an annular series of notches spaced to correspond to the angular spacing of the teeth on a cutter to be sharpened, a latch dog mounted on said table for movement into and out of said notches and yieldably urged toward said plate, an electric motor adapted when energized to turn said spindle, a member mounted on said table to shift longitudinally thereof and yieldably urged in the direction of the forward table stroke, an element mounted on said member for movement transversely of the table motion and yieldably urged into a predetermined position, a stationary stop acting in the final retraction of said table to engage and block said element when the latter is in said predetermined position while releasing the element when the latter is moved out of said position, means actuated in the movement of said member after blocking of said element to withdraw said latch dog and release said spindle for indexing movement, means operating in the continued return movement of said table to engage said element and release the latter from said stop, and switching means operable to energize said motor in response to the withdrawal of said latch dog from one of said notches and to deenergize in response to the subsequent entry of said latch dog in the next one of said notches.

9. A cutter sharpener having, in combination, a horizontal table reciprocable back and forth in forward and return strokes, means on said table supporting a cutter to be sharpened including a spindle rotatable about an axis paralleling the table motion, an index plate fast on said spindle and having therein an annular series of notches spaced to correspond to the angular spacing of the teeth on a cutter to be sharpened, a latch dog mounted on said table for movement into and out of said notches and yieldably urged toward said plate, a member mounted on said table to shift longitudinally thereof and yieldably urged in the direction of the forward table stroke, an element mounted on said member for movement transversely of the table motion and yieldably urged into a predetermined position, a stationary stop acting in the final retraction of said table to engage and block said element when the latter is in said predetermined position while releasing the element when the latter is moved out of said position, means actuated in the movement of said member after blocking of said element to withdraw said latch dog and release said spindle for indexing movement, means operating in the continued movement of said table to engage said element and release the latter from said stop, and means operable as an incident to withdrawal of said latch dog to apply a turning torque to said spindle.

10. A cutter sharpener having, in combination, a horizontal table reciprocable back and forth, means on said table supporting a cutter to be sharpened including a spindle rotatable about an axis paralleling the table motion, an index member on said spindle and having therein an annular series of notches spaced to correspond to the angular spacing of the teeth on a cutter to be sharpened, a latch dog mounted on said table for movement into and out of said notches, a part member mounted on said table to shift longitudinally thereof, an element mounted on said part for movement relative to the part transversely of the table motion and yieldably urged into a predetermined position, a stationary stop acting in the final retraction of said table to engage and block said element when the latter is in said predetermined position while releasing the element when the latter is moved out of said position, means actuated in the movement of said part after blocking of said element to withdraw said latch dog and release said spindle for indexing movement, means operating in the continued movement of said table to engage said element and release the latter from said stop, and means operable to apply a torque to said spindle and turn the latter when said latch dog is withdrawn.

11. A cutter sharpener having, in combination, a horizontal table reciprocable back and forth, means on said table supporting a cutter to be sharpened including a spindle rotatable about an axis paralleling the table motion, an index member fast on said spindle and having therein an annular series of notches spaced to correspond to the angular spacing of the teeth on a cutter to be sharpened, a latch dog mounted on said table for movement into and out of said notches, a part mounted on said table to shift longitudinally thereof, an element mounted on said member for movement transversely of the table motion, stop means engageable with said element in the final retraction of said table to shift the element and said part longitudinally of the table, means actuated in such movement of said part to withdraw said latch dog and release said spindle for indexing movement, and subsequently operating means actuating said element to shift the same laterally of the table and release the element from said stop means.

12. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for movement into and out of said notches and yieldably urged toward said member, a trip element supported on said table for movement relative thereto, stationary means positioned to engage said trip element in the final return motion of said table and interrupt the further advance of the element with the table whereby to cause relative movement between the trip element and table as the table continues to advance, means actuated by such motion of the trip element to withdraw said latch dog and release said index member, and cam means subsequently operable in the continued movement of the table to disable said stationary means whereby to release said latch dog for entry in the next notch presented thereto.

13. A cutter sharpener having, in combination, a horizontal reciprocable table, a power actuator energized selectively to move said table back and forth in automatically repeated forward and return strokes, means on said table supporting a cutter to be sharpened including a spindle, an index member fast on said spindle and having peripheral notches, a latch dog mounted on said table for movement into and out of said notches, means actuated in the final retracting movement of said table to withdraw said dog from a notch in said member, to turn said spindle, and then to release said dog for reengagement with the next one of said notches presented thereto, and mechanism responsive to the movements of said dog and operable while the dog is withdrawn to release said spindle, to permit said actuator to complete the return stroke of the table but to disable the actuator against starting the next forward table stroke until said dog has become fully seated in the next notch.

14. A cutter sharpener having, in combination, a horizontal table reciprocable back and forth, means on said table supporting a cutter to be sharpened including a spindle rotatable about an axis paralleling the table motion, an index member fast on said spindle and having notches angularly spaced to correspond to the spacing of the teeth on said cutter, a latch dog mounted on said table for radial movement into and out of said notches, means yieldably urging said dog into said notches, a collar encircling said spindle and mounted for movement axially thereof, means connecting said collar and said latch dog to shift the latter inwardly and outwardly in opposite movements of the collar, a trip element connected to said collar and supported on said table for movement relative thereto in opposite directions, and stationary means engageable with said trip element in the final portion of the retracting movement of said table and operable to shift said element relative to the table in a direction to move said collar in a direction to withdraw said latch dog from one of said notches.

MAE K. RANSOME,
*Conservator for Stafford M. Ransome, Incompetent.*

REFERENCES CITED

The following references are of record in the file of this patent:

UNITED STATES PATENTS

| Number | Name | Date |
|---|---|---|
| 1,973,329 | Bullows | Sept. 11, 1934 |
| 2,187,544 | Laessker | Jan. 16, 1940 |
| 2,206,492 | Westenberger et al. | July 2, 1940 |
| 2,292,588 | Terbrueggen | Aug. 11, 1942 |
| 2,296,731 | Mustonen | Sept. 22, 1942 |
| 2,388,173 | Miller | Oct. 30, 1945 |
| 2,442,635 | Bennett | June 1, 1948 |
| 2,506,495 | Flanders et al. | May 2, 1950 |

FOREIGN PATENTS

| Number | Country | Date |
|---|---|---|
| 375,557 | Great Britain | June 30, 1932 |